US012129996B2

(12) United States Patent
Anuel Martinez et al.

(10) Patent No.: US 12,129,996 B2
(45) **Date of Patent: *Oct. 29, 2024**

(54) DUO LED LIGHT FIXTURE WITH A DOWNLIGHT SOURCE AND AN OPTIONALLY OPERABLE UPPER LIGHT SOURCE

(71) Applicant: GLOBE ELECTRIC COMPANY INC., Montreal (CA)

(72) Inventors: Rafael Alfredo Anuel Martinez, Verdun (CA); Guy J. Houle, Blainville (CA); Scott Blaise Tylicki, Bowling Green, KY (US)

(73) Assignee: GLOBE ELECTRIC COMPANY INC., Montreal (CA)

(*) Notice: Subject to any disclaimer, the term of this patent is extended or adjusted under 35 U.S.C. 154(b) by 0 days.

This patent is subject to a terminal disclaimer.

(21) Appl. No.: 18/420,503

(22) Filed: Jan. 23, 2024

(65) Prior Publication Data

US 2024/0240780 A1 Jul. 18, 2024

Related U.S. Application Data

(63) Continuation of application No. 18/131,854, filed on Apr. 6, 2023, now Pat. No. 11,906,142.
(Continued)

(51) Int. Cl.
*F21V 23/00* (2015.01)
*F21K 9/60* (2016.01)
(Continued)

(52) U.S. Cl.
CPC .............. *F21V 23/005* (2013.01); *F21K 9/60* (2016.08); *F21S 8/026* (2013.01); *F21S 8/046* (2013.01);
(Continued)

(58) Field of Classification Search
CPC .. F21V 23/005; F21V 23/0435; F21V 29/503; F21V 29/89; F21V 19/0035; H05B 45/10; F21S 8/026
See application file for complete search history.

(56) References Cited

U.S. PATENT DOCUMENTS 10,873,170 B2 * 12/2020 Zimmerman, III .......................... H04B 10/25891
11,187,400 B1 * 11/2021 Ribeiro ................... F21S 8/086
(Continued)

FOREIGN PATENT DOCUMENTS

| | | |
|---|---|---|
| CN | 102484918 | 5/2012 |
| CN | 102860129 | 1/2013 |
| CN | 105704858 | 6/2016 |

*Primary Examiner* — Mary Ellen Bowman
(74) *Attorney, Agent, or Firm* — Gray Ice Higdon

(57) ABSTRACT

A dual LED light fixture is comprised by a lower LED light source housing and an upper LED light source housing. A lower LED light source is mounted in the lower light source housing to generate downlight. An upper LED light source is mounted in the upper LED light source housing and remote from an outer circumferential light transmitting outer side area of the upper light source housing and from which is emitted side light illumination. An LED power supply and light control circuit mounted in the LED light fixture and adapted for connection to a power source. The LED light power supply and control circuit has a dimming circuit and a lower and upper driver current supply circuit. A switch is operative to connect driver current to the upper LED light source when actuated to an "on" position and to disconnect driver current to the upper LED light source when in a normal "off" position. The switch is operative for engagement to its "on" position when desirable to provide drive current to the upper light source and illumination from both
(Continued)

the lower and upper LED light sources of the LED light fixture. Various embodiments of the LED light fixture is described.

21 Claims, 10 Drawing Sheets

Related U.S. Application Data

(60) Provisional application No. 63/328,383, filed on Apr. 7, 2022.

(51) Int. Cl.

| | |
|---|---|
| ***F21S 6/00*** | (2006.01) |
| ***F21S 8/02*** | (2006.01) |
| ***F21S 8/04*** | (2006.01) |
| ***F21V 19/00*** | (2006.01) |
| ***F21V 23/04*** | (2006.01) |
| ***F21V 29/503*** | (2015.01) |
| ***F21V 29/89*** | (2015.01) |
| ***F21Y 107/50*** | (2016.01) |
| ***F21Y 113/13*** | (2016.01) |
| ***F21Y 115/10*** | (2016.01) |
| ***H05B 45/10*** | (2020.01) |

(52) U.S. Cl.

CPC ........ *F21V 19/0035* (2013.01); *F21V 23/003* (2013.01); *F21V 23/0435* (2013.01); *F21V 23/0485* (2013.01); *F21V 29/503* (2015.01); *F21V 29/89* (2015.01); *H05B 45/10* (2020.01); *F21S 6/008* (2013.01); *F21Y 2107/50* (2016.08); *F21Y 2113/13* (2016.08); *F21Y 2115/10* (2016.08)

(56) References Cited

U.S. PATENT DOCUMENTS

| | | | |
|---|---|---|---|
| 11,906,142 | B2 * | 2/2024 | Anuel Martinez ... F21V 23/003 |
| 2013/0003369 | A1 | 1/2013 | Hiraoka et al. |
| 2020/0191344 | A1 | 6/2020 | Van Winkle |
| 2021/0075170 | A1 * | 3/2021 | Zimmerman, III ..... F21V 23/06 |
| 2023/0324016 | A1 | 10/2023 | Anuel Martinez et al. |
| 2023/0324036 | A1 | 10/2023 | Anuel Martinez et al. |

* cited by examiner

DUO LED LIGHT FIXTURE WITH A DOWNLIGHT SOURCE AND AN OPTIONALLY OPERABLE UPPER LIGHT SOURCE

FIELD OF THE INVENTION

The present invention relates to LED light fixtures and more particularly to dual LED ceiling light fixtures having a downlight housing to emit downlight and an upper light housing to optionally emit side light.

BACKGROUND OF THE INVENTION

LED light fixtures have become the fixture of choice over incandescent type lighting fixtures due to its many advantageous properties, such as., its low power consumption, compactness, longer life span and multiple control features whereby the intensity and the correlated color temperature "CCT" of the LED"S can be controlled to generate a desirable light tone and color to suit a particular environment or occasion. Dual LED light fixtures are also known such as described, for example, in U.S. patent application Ser. No. 13/634,173, entitled "Lighting Apparatus" and U.S. patent application Ser. No. 16/710,777 entitled "LED Light Fixture with Nightlight". Both these patent applications teach providing ceiling LED light fixtures of specific construction to generate downlight in a lower portion of the fixture and side night light from an upper portion of its structure.

The present invention relates to a dual LED light fixture of a novel construction which provides the user person with features permitting modifications to its upper light housing which are easy to adapt and which features are not taught by the prior art.

SUMMARY OF THE INVENTION

It is therefore a feature of the present invention to provide a ceiling mountable dual LED light fixture with optionally configurable features of its upper light housing which are easy to adapt by a user person and wherein the light fixture is also easy to install in a recessed ceiling junction box.

Another feature of the present invention is to provide a dual LED light fixture which utilizes a common power source supply and dimming circuit and independent drive current circuits to power a lower and upper LED light set simultaneously or independently.

A still further feature of the present invention is to provide a dual LED light fixture wherein the upper LED light source housing is provided with a switch which is accessible to permit for the upper light source to be activated or deactivated by a user person.

A further feature of the present invention is to provide a dual LED light fixture having a lower light housing to provide downlight and an upper light housing to provide side light, and wherein the upper light housing has a light source which is optionally made operable through a switch which can be activated by the installation of a light fixture part by a user person or by a switch which can be operated by the fingers of a user person.

Another feature of the present invention is to provide a dual LED light fixture wherein the LED's in the lower and upper housings of the light fixture are locally operable by a wall-mounted dimmer switch or remotely by an apt downloaded in a computerized wireless device, such as a smart phone or personal computer, or other like devices.

A still further feature of the present invention is to provide a dual LED light fixture wherein both white LED's and colored RGB LED's are mounted in a lower LED light housing and in an upper LED light housing and wherein the light intensity and correlated color temperatures (CCT) of the LED's can be remotely controlled by the use of an apt downloaded in a smart wireless device.

A further feature of the present invention is to provide a dual LED light fixture wherein the upper LED light housing has an open circumferential outer peripheral end wherein the light emitted by the upper LED light source is visible from behind the outer top peripheral end of the lower LED light housing creating the impression that the light fixture is detached from the ceiling and floating there above.

A still further feature of the present invention is to provide a dual LED light fixture wherein the upper LED light source is mounted in a hub region of the fixture remote from the outer peripheral side area to permit the optional connection of a circumferential opaque or light transmitting ring about the outer peripheral side area.

According to a further feature of the present invention is to provide the LED light fixture in different fixture configurations, such as a table lamp, a floor lamp or different flush ceiling mounted designs.

According to the features above, there is provided a dual LED light power supply and control circuitry. The dual LED light power supply and control circuitry may include a dimming circuit. The dimming circuit may provide input from a voltage converter to the power supply and control circuitry. A lower driver current supply circuit and an upper drive current supply circuit may be provided. The lower driver current supply circuit may supply a first set of white LEDs and a first set of colored RGB LEDs, the first set of white LEDs and the first set of colored RGB LEDs being connected in parallel. The upper driver current supply circuit may supply a second set of white LEDs and a second set of colored RGB LEDs, the second set of white LEDs and the second set of colored RGB LEDs being connected in parallel. A normally open switch may be provided. The normally open switch may connect the lower driver current supply circuit and the upper driver current supply circuit when closed, the lower driver currently supply circuit being connected to the power supply and control circuitry when the normally open switch is open or closed.

According to a further aspect of the invention, the driver current may be disconnected from the second set of white LEDs and the second set of colored RGB LEDs when the normally open switch is open.

According to a further aspect of the invention, the switch is a push-button switch positioned on a lower LED housing. The normally open switch may be closed when an upper LED housing is interfaced with the lower LED housing.

According to a further aspect of the invention, the normally open switch may be a slide switch accessible on a rear face of a division wall interfacing with an upper LED housing and a lower LED housing.

According to a further aspect of the invention, the dimming circuit may control current provided to the upper current driver supply circuit and the lower current driver supply circuit.

According to a further aspect of the invention, the normally open switch may be an electronic switch operated by a remote wireless communication device to provide remote selective operation of both the upper current driver supply circuit and the lower current driver supply circuit.

According to a further aspect of the invention, the electronic switch may be a transistor switch and/or a MOSFET switch. The remote wireless communication device may be a remote wireless control device, an app downloaded in a "smart" control device, a biometric data authentication software downloaded in a recognition device, and/or a capacitive touch actuating device.

According to a further aspect of the invention, the LED power supply and light control circuit is mounted in a central region of a top wall of an upper projecting hub formation of an upper LED housing. The central region may be provided with connectors for securement to a mounting plate attached to a recessed ceiling junction box.

According to a further aspect of the invention, the first set of white LEDs, the first set of colored RGB LEDs, the second set of white LEDs, and the second set of colored RGB LEDs may be mounted on a outer heat conductive support ring formed of an aluminum substrate to conduct and radiate heat generated by the LEDs.

According to the features above, there is provided a dual LED light fixture. The dual LED light fixture may comprise multiple components including the following. A lower LED light source housing which may include an outer circumferential LED light housing section having a first lower LED light source to generate downlight. The outer circumferential LED light housing section may have an outer diameter defined by an outer side wall and an inner diameter defined by a depending circumferential division side wall. An inner central LED light housing section may have a second lower LED light source to generate downlight. The inner central LED light housing section may have a diameter defined by the depending circumferential division side wall. An upper LED light source housing may be located on an outer circumferential light transmitting outer side area adjacent to the lower LED light source housing. The upper LED light source housing may include an upper LED light source to generate rear and/or side light illumination. The upper LED light source may be mounted in the upper LED light source housing and positioned spaced inwardly from the outer circumferential light transmitting outer side area. An LED power supply and light control circuit may be mounted in association with the LED light fixture and adapted for connection to a power source. The LED light control circuit may have a dimming circuit and a lower and upper driver current supply circuit. A switch may be operative to connect driver current to the upper LED light source when actuated to an "on" position and to disconnect driver current to the upper LED light source when in a normal "off" position. The switch may be operative for engagement to the "on" position to provide driver current to the upper LED light source and illumination from both the lower and upper LED light sources of the LED light fixture.

According to a further aspect of the invention, the first lower LED light source and the second lower LED light source may be independently operable.

According to a further aspect of the invention, the upper LED light source housing further may include a driver housing for the LED power supply and light control circuit, a top wall, and a translucent circumferential lens.

According to a further aspect of the invention, the diameter of the outer side wall and a diameter of the upper LED light source housing may be equivalent.

According to a further aspect of the invention, the top wall may have a top base for flush mount fitting with a ceiling, a top wall sidewall perpendicular to the top base, and an end opposite the top base. The end opposite the top base may be being adjacent to a top base of the translucent circumferential lens which is opposite a bottom end of the circumferential lens which is adjacent to the outer side wall. The heights of the top wall sidewall and the translucent circumferential lens may be equivalent.

According to a further aspect of the invention, the outer circumferential housing section may include a first light transmitting lens and the inner central LED light housing section may include a second light transmitting lens.

According to a further aspect of the invention, a base of the circumferential division side wall and a base of the outer side wall may be level with an exposed side of the first light transmitting lens from which both the base of the circumferential division side wall and the base of the outer side wall extend away from.

According to a further aspect of the invention, an end opposite the base of the circumferential division side wall may extend further from the exposed side of the first light transmitting lens than an end opposite of the base of the outer side wall extends.

According to a further aspect of the invention, the lower driver current supply circuit may be comprised of a first driver current circuit section operative to provide driver current to the first LED light source and a second driver current circuit section operative to provide driver current to the second LED light source. The lower driver current supply circuit may supply the first driver current circuit and the second driver current supply circuit independently or jointly.

According to a further aspect of the invention, the dimming circuit may independently or jointly control light intensity generated by the first LED light source and the second LED light source.

According to the features above, there is provided a dual LED light power supply and control circuitry. The dual LED light power supply and control circuitry may include a dimmer circuit. The dimmer circuit may provide input from a voltage converter to the power supply and control circuitry. A lower driver current supply circuit and an upper drive current supply circuit may be included. The lower driver current supply circuit may include a first LED driver circuit for driving a first set of LEDs and a second LED driver circuit for driving a second set of LEDs. The first set of LEDs and second set of LEDs may be independently operable by the dimmer circuit. The upper driver current supply circuit may supply a third set of LEDs. The third set of LEDs may be independently operable from the first set of LEDs and the second set of LEDs on the dimming circuit. A normally open switch may be included. The normally open switch may connect the lower driver current supply circuit and the upper driver current supply circuit when closed. The lower driver currently supply circuit may be connected to the power supply and control circuitry when the normally open switch is open or closed.

DESCRIPTION OF THE DRAWINGS

A preferred embodiment of the invention and modifications thereto will now be described with reference to the accompanying drawings in which.

DESCRIPTION OF THE PREFERRED EMBODIMENT

Figure 1:
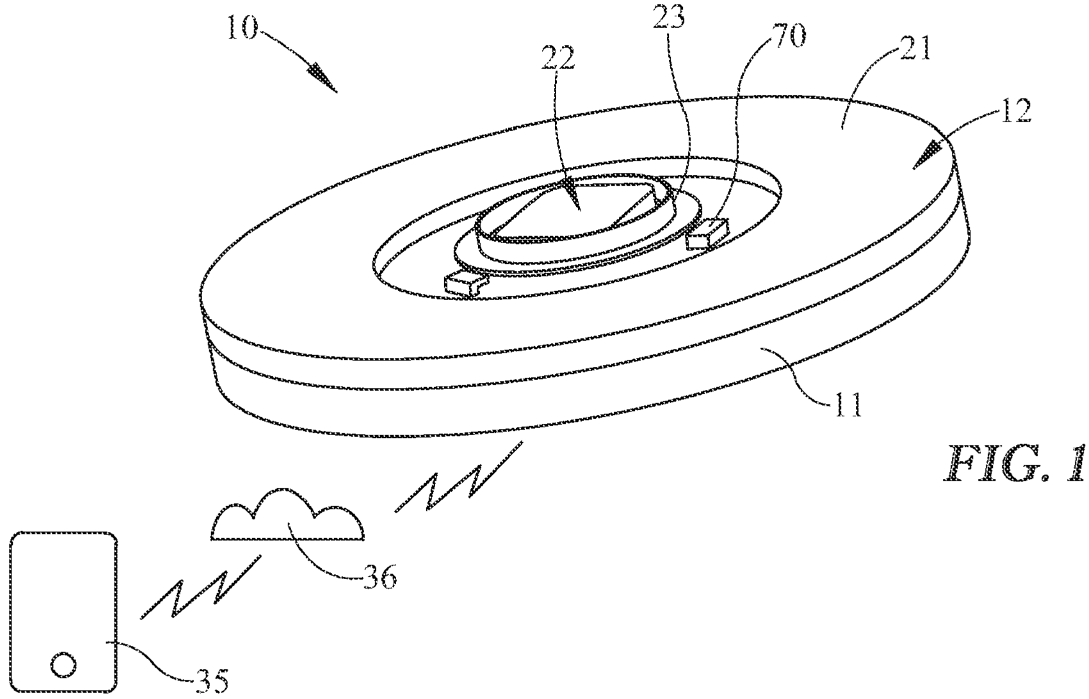
FIG. 1 is a rear perspective view of the dual LED light fixture with the optional rear cover plate installed whereby both the lower and upper LED light source are placed in an operative state and showing the packaging of the power supply and control circuit inside a central area of the light fixture which is partly mounted inside a junction box when the light fixture is attached to a mounting plate secured to a recessed ceiling junction box.
Figure 2:
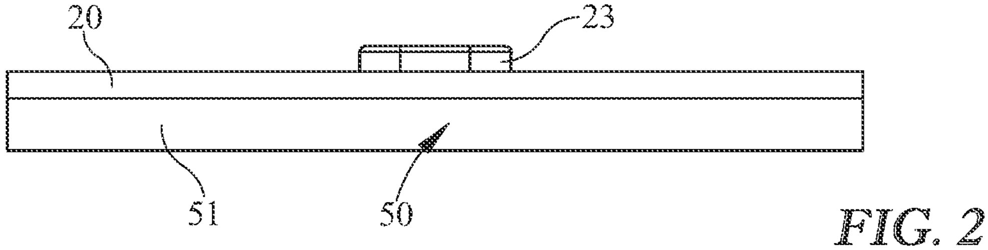
FIG. 2 is a side view of FIG. 1 with the rear cover plate installed.
Figure 3:
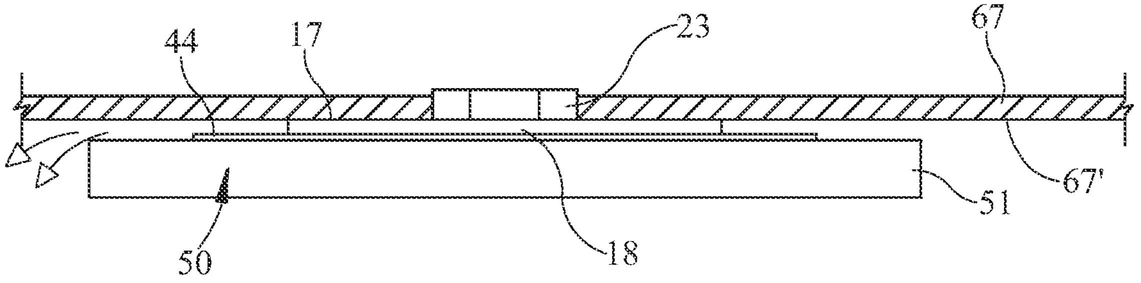
FIG. 3 is a side view of FIG. 1 with the rear cover plate having been removed to deactivate the upper LED light source or to provide side light from the upper LED light source to escape uninterruptedly from behind the outer peripheral edge area of the upper light housing.

Before any embodiments of the present invention are explained in detail, it is to be understood that the application is not limited to some of the details of construction and the arrangement of component part set forth in the following description or illustrated by the following drawings. Further, it is to be understood that the phraseology and terminology used herein is for the purpose of description of the present invention and different embodiments thereof and should not be regarded as limiting but should encompass equivalents thereof.

Referring now to the drawings, and more specifically to FIGS. 1 to 6, there is shown generally at 10 the dual LED light fixture of the present invention. The embodiment of the Dual LED light fixture described herein if of a circular shape, somewhat like a flat disc, but it is to be understood that the light fixture may have many different shapes and is not to be construed as being limited to this shape, As better illustrated in the sectional views of FIGS. 5 to 7, the dual LED light source is generally comprised of a lower LED light source housing 11 and an upper LED light source housing 12 isolated from one another by a division wall 13. A lower LED light source 14 mounted in the lower light source housing 11 to generate downlight through a diffuser plate assembly as described later. An upper LED light source 15 is mounted in the upper LED light source housing 12 about a circumferential side wall 16 of a large hub formation 17 to position the upper LED source 15 in the form of a circumferential LED light bar 18 spaced inwardly of an outer circumferential light transmitting outer side area 19. A transparent light conductive wall 20 of an optional upper light source rear cover plate 21 extends in the outer side area 19 when the optional rear cover plate 21 is installed by a user person and through which side light illumination is emitted. The optional back cover 21 is formed of transparent plastics material. An upper LED light source protective cover 61, formed of transparent plastics material, is also secured entirely about the upper LED light source 15 for protection and mounted about the hub region 17 and over the upper LED light source 15 and also spaced inwardly of the outer side area 19. The protective cover 61 has attachment flanges 61' to receive fasteners 49, see FIG. 4, to secure it to the outer surface 13' of the division wall as illustrated in FIG. 5.

An LED power supply and control circuit 22 is mounted on a circuit board 38 secured in the LED light fixture and adapted for connection to a power source, which is the voltage supply wires commonly found in an electrical junction box, as will be described later with reference to FIGS. 9A to 9D. The LED power supply and control circuit 22 is mounted in a central protective ring 23 projecting from an outer surface 24 of the hub region 17 and configured to be housed into an open end of an electrical junction box when the dual LED light fixture is connected thereto, as illustrated. A protective cover 59 is secured over the protective ring 23 and through which power connecting leads emerge for connection to a power source.

Figures 8A, 8B:
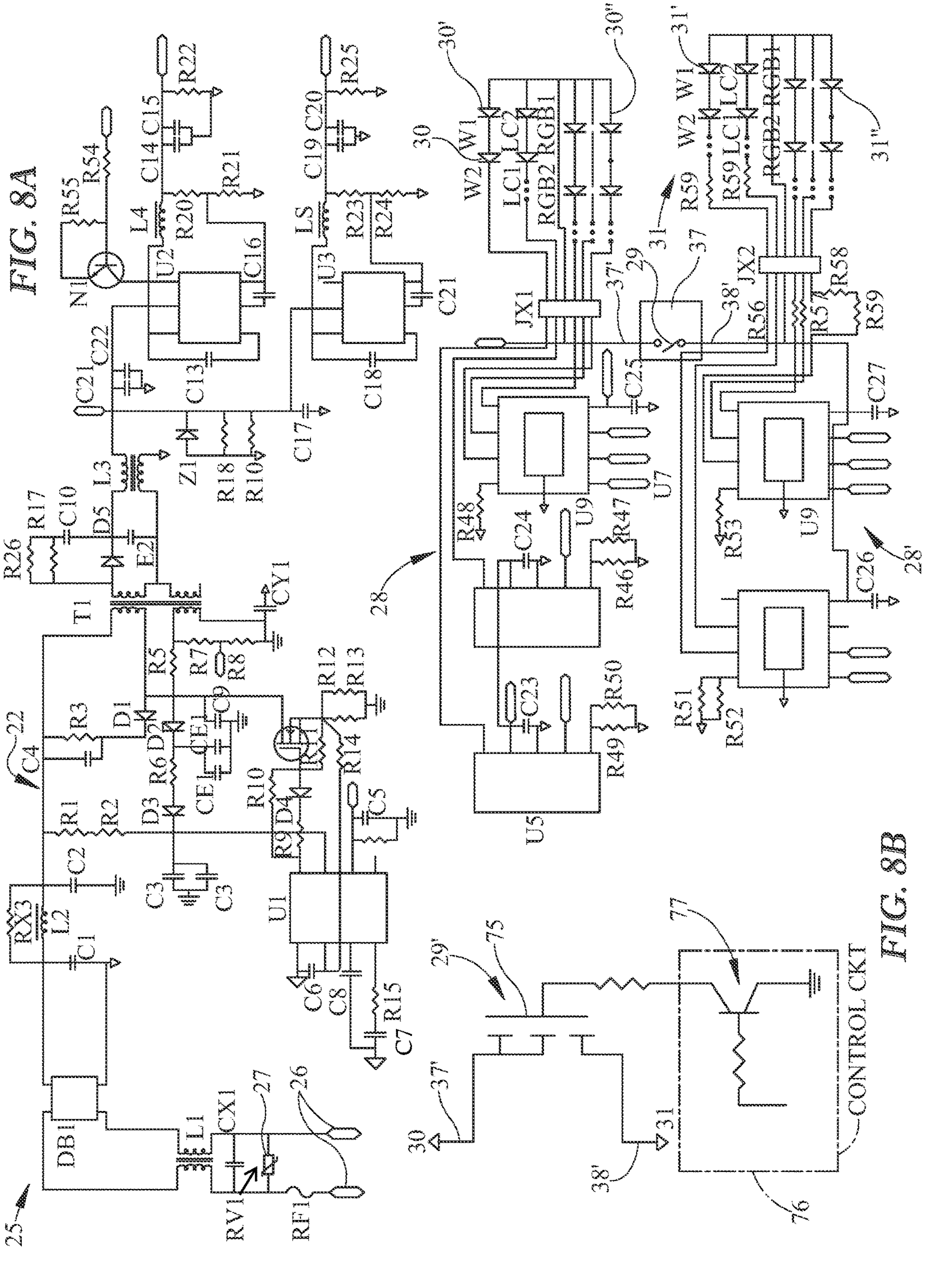
FIG. 8A is a schematic diagram of the power supply and control circuit illustrating the two LED light source driver circuits and the switch which provides connection of driver current to the upper LED light source.
FIG. 8B is a schematic diagram of a MOSFET electronic switch which is remotely controlled to establish connection of the upper light source to its driver circuit.

Referring to FIGS. 8A and 8B, there is illustrated the power supply and control circuitry 22. It consists essentially of a voltage converter and dimming circuit 25 supplied by a 120 volts household supply voltage leads found in a wall light switch junction box and connected to its input leads 26. The dimmer switch 27 is then mounted in the wall switch junction box to manually control the light intensity of the LED power sources 14 and 15, locally. The power supply and control circuit 22 further includes a lower driver current supply circuit 28 and an upper driver current supply circuit 28'. The lower driver current supply circuit 28 supplies two sets of LED's 30, herein a first set 30' comprised of white LED's and a second set 30" comprised of color RGB LED's. Likewise, the upper driver current supply circuit 28 supplies two sets of LED's 31, herein a first set 31' comprised of white LED's and a second set 31" comprised of color LED's 31". The white and color LED's are connected in parallel as herein illustrated and mounted on heat conductive support rings 48 and 48', respectively as will be described herein below.

As shown, a normally open "NO" switch 29 is connected between the two driver current supply circuits 28 and 28' at its switch outputs 37', 38', respectively, and when actuated to a closed "on" position, connects driver current to the upper LED light sets 31. Otherwise, the switch 29 is in a normal "off" position, as shown, and driver current is disconnected form the upper LED light sets 31. Therefore, when the switch is actuated to its closed "on" position, illumination from both the lower and upper LED light sources 14 and 15 is made possible.

It is further contemplated, as schematically illustrated in FIGS. 1, 8A and 8B, that an application "apt" may be provided for download into a computerized wireless communicating device, such as a smart phone 35, shown in FIG. 1, to provide remote selective operation of both the lower and upper LED light sources by the use of an electronic switch, such as the MOSFET switch 29' illustrated in FIG. 8B. As shown, the MOSFET switch 29' is in a normally "open" condition with its gate 75 shown open at a non-conductive position wherein only the lower downlight is functional and the upper light source is deactivated. The apt in the smart phone 35 has a function which provides communication with a control circuit 76 through the internet 36 and is provided with a control transistor circuit 77 which provides a control voltage to the gate 75 of the MOSFET switch 29' to establish a conductive patch to the lower LED's output terminal 38' to permit operation and control of the upper and lower LED light sets 31 and 30, respectively.

The apt may also have a mode of operation to allow the unit to automatically function at different times of the day and perform selected ones of pre-set functions to operate the LED's of the lower and upper light sources, such as combinations of light dimming and CCT control to create pre-set lighting features. It is pointed out that the apt can also have a function to also operate the dimming circuit 25 of the LED sets 30 and 31, typically between warm light (about 3000K CCT) and cold light (about 6500K CCT). The method of adjusting brightness and color temperature of LED's is known in the art wherein to create an adjustable light feature depending on a desired light mood to be generated by a light fixture. It is further pointed out that the electronic switch, herein the MOSFET 29' can also be controlled by a remote control wireless device, or by a device capable of operation using biometric data to identify a registered user person or even capacitive touch to the fixture is outed at an accessible location.

Figure 4:
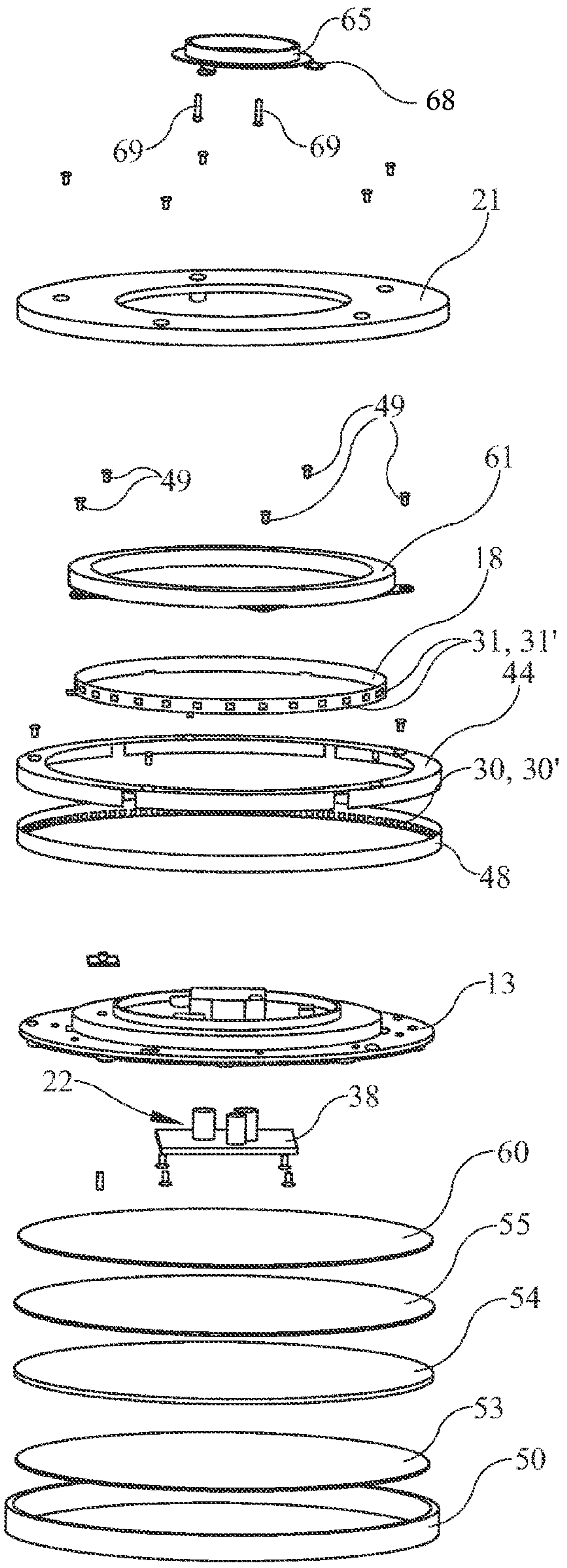
FIG. 4 is an exploded view of the dual LED light fixture illustrating its component parts with the rear cover plate.
Figure 6:
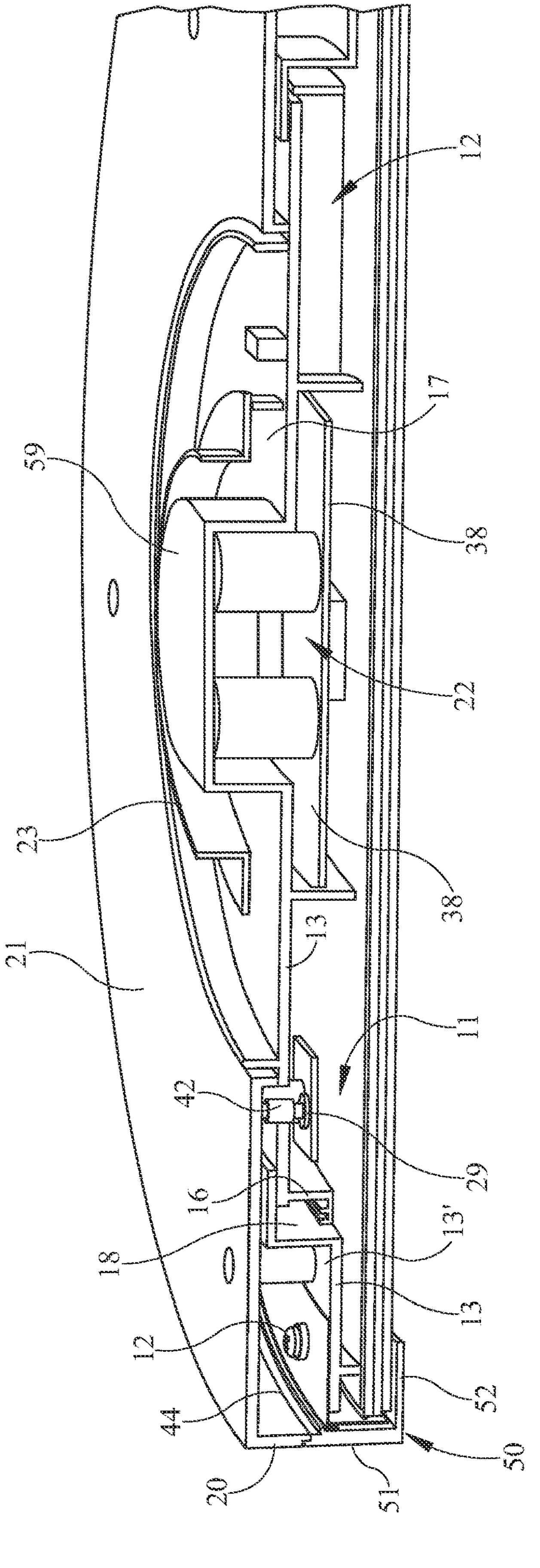
FIG. 6 is a fragmented perspective sectional side view of the dual LED light fixture with the rear cover plate installed and illustrating the assembly of the component parts of the light fixture as shown in the exploded view of FIG. 4.
Figure 7:
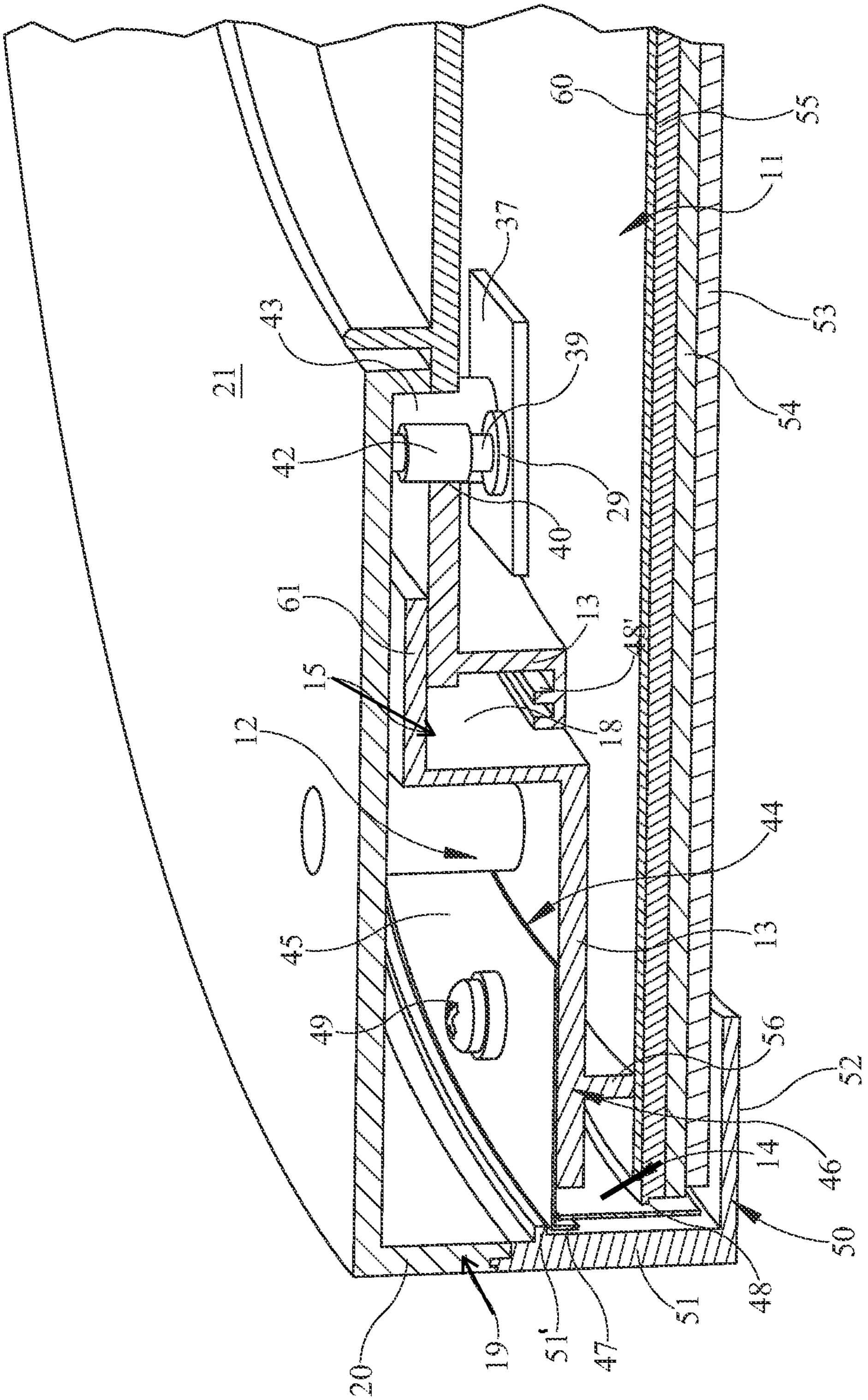
FIG. 7 is a further enlarged sectional side view of part of the dual LED light fixture with the optional rear cover plate installed to depress the button switch to its "on" position to supply drive current to the upper light source.

In the embodiment illustrated in FIGS. 6 and 7, the switch 29 is a push-button switch mounted on a support board 37 and connected to the main printed circuit board "pcb" 38 which contains the power supply and control circuit 22. The push-button switch 29 has an actuating member in the form of a push-button post 39 spring biased outwards to its "off" state and which when pushed inwards effects a switch closure and places it to its "on" state to provide drive current to the upper led light source 15. A hole 40 is formed in the division wall 13 for alignment with, and providing access to, the push-button post 39 of the switch 29. The switch 29 is actuated by the upper light source optional rear cover plate 21, when installed at an upper end of the light fixture 10 and connected to the division wall 13 by screws 41, as shown in FIG. 4. The upper light source optional rear cover plate 21 is provided with a switch actuating post 42, projecting downward from an inner surface 43 of the cover plate 21 and aligned for contact with the upper end of the push-button post 39 to depress the push-button post 39 and close the switch. Accordingly, when the upper light source cover is installed, it establishes the connection for the supply of drive current, from the driver circuit 28', to the upper light source 15 by maintaining the switch in a closed "on" position.

Referring again to FIGS. 5A to 7, and has can be better seen in FIG. 7, the lower light source housing 11 has a heat dissipator L-shaped metal ring 44 secured about the outer peripheral edge of the division wall 13 by screws 49. The heat dissipating ring 44 is L-shaped to define a flat top flat wall 45 for contact with the outer flat peripheral edge region 46 of the division wall 13 and a depending transverse outer flange 47 for clamping retention over a top edge of a heat conductive support ring 48 on which the light sets of LED's 30 are mounted. The heat conductive support ring 48 dissipates heat generated by the sets of LED's 30 when operative. The lower light source housing 11 has solid circumferential support frame 50 of L-shaped cross-section defining a circumferential opaque vertical side wall 51 which is engaged by inner clamp projections 51' over a circumferential outer edge of the heat dissipator metal ring 44.

The solid circumferential support frame 50 also defines a transverse inwardly projecting support flange wall 52 to support a bottom light lens assembly comprised of a diffuser plate 53 on top of which is positioned a light guide plate 54 formed of transparent light conductive material to conduct light generated by the lower LED's 30 mounted on the inner face of the outer heat conductive support ring 48 and disposed in facial relationship with the outer circumferential edge of the light guide plate 54. A sheet 55 of reflective material is supported entirely over an outer surface of the light guide plate 54 to direct light downwards and above which is mounted a rigid foam material sheet 60 to provide a thermal barrier and which is supported spaced from the division wall 13 by a depending spacer flange 56 formed integral with the division wall 13.

Figure 5A:
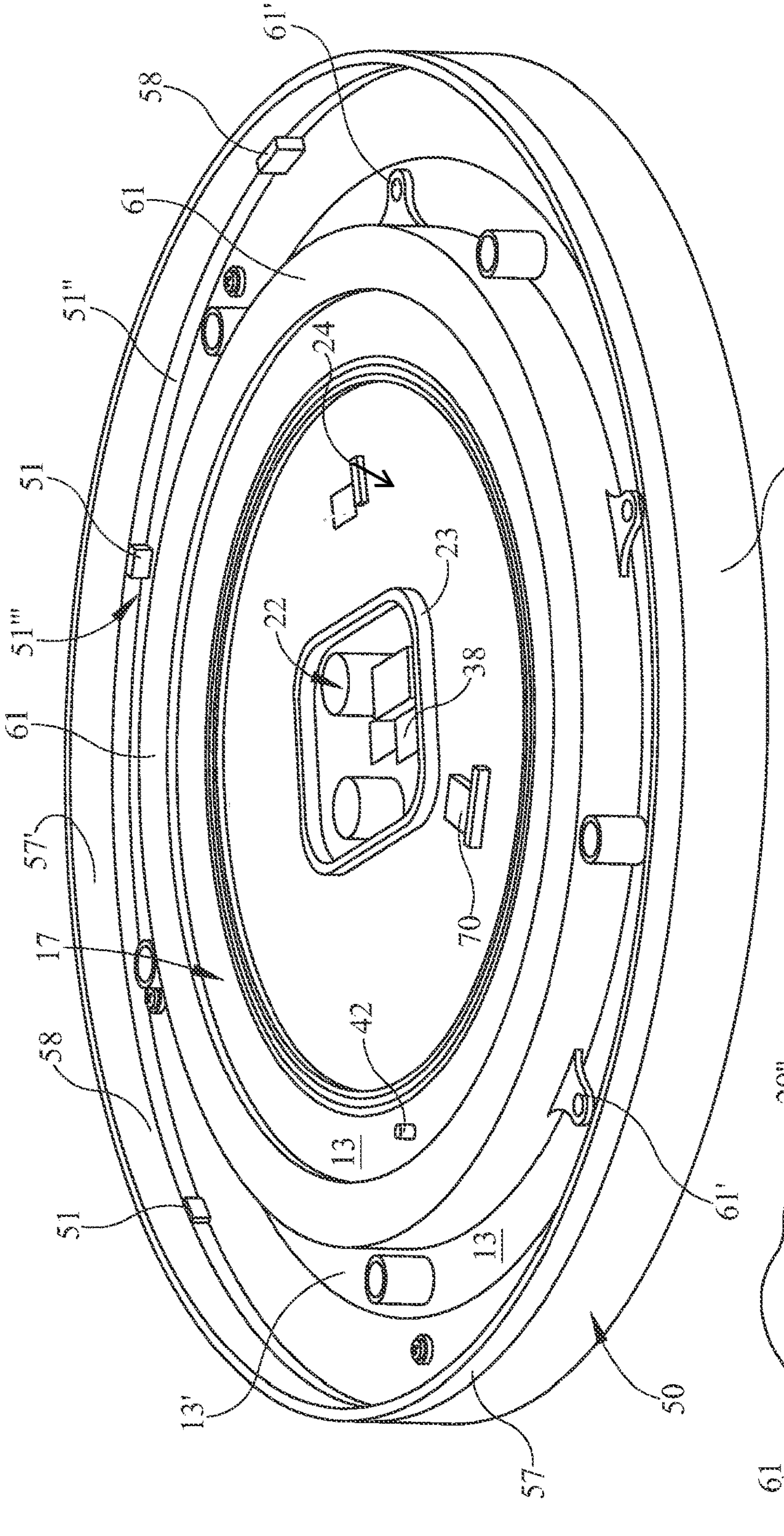
FIG. 5A is a further rear perspective view of the dual LED light fixture with the rear cover plate removed to deactivate the upper LED light source and showing the push-button switch actuation post projecting from the outer surface of the hub region of the fixture in a deactivated state.
Figure 5B:
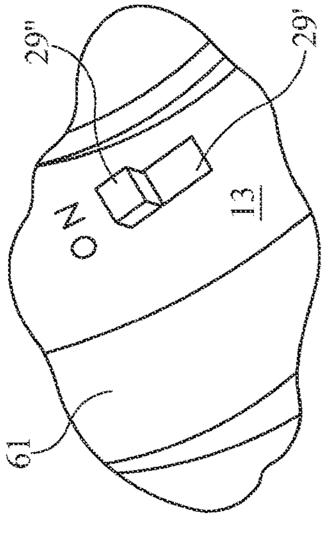
FIG. 5B is a fragmented view showing a different type of switch, herein a slide switch having been moved to an "on" position by the fingers of a user person to provide drive current to the LED's of the upper light housing.

With reference to FIGS. 5A and 5B, there is shown a modification of the upper light housing wherein when the rear optional cover plate 21 is not installed, the outer open peripheral opened area 19, of the upper light source housing 12, can be shielded by mounting a solid opaque circumferential flat ring 57 about a top edge of the vertical side wall 51 of the lower support frame 50 to prevent any light from the lower light source 14 to escape. The ring is retained over and about the vertical side wall 51 by hook formations 58 secured to a lower end of its inner side wall 57' and disposed space apart and projecting downwards for frictional engagement with the inner face 51" of the top projecting portion 51'" of the side wall 51, as herein illustrated.

In a further embodiment of the present invention, as shown in FIG. 5B, the switch 29 is provided in the form a slide button switch 29', instead of a push-button switch, and which is accessible at a convenient location on the top surface of the division wall and wherein the user person can simply move the slider 29" of the switch to an "on" position, as herein illustrated, whereby to provide connection for the supply of drive current to the upper LED's. The optional rear cover plate 21 is not required, with such embodiment as it does not require the installation of the rear cover plate 21. However, several options are made possible concerning the outer peripheral outer side area 19 of the upper light housing, wherein that area can be left open and unobstructed for light to escape and to light the surface of the ceiling and made visible behind the upper light housing 12 and giving the impression that the lower light source housing of the dual LED light fixture is floating below the ceiling.

Another modification would be to make the circumferential flat ring 57 of transparent plastics material and secure it to the top edge of the sidewall 51 of the support frame 50 to provide illumination therethrough. A still further modification would be to make the rear cover plate 21 without the switch actuating post 42 and entirely of transparent plastics material. below the ceiling.

Figure 9A:
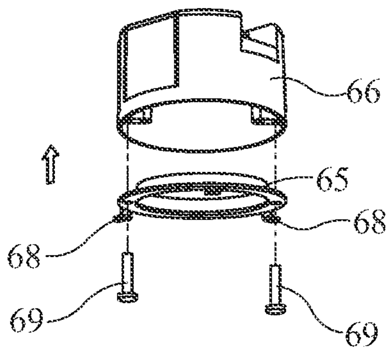
FIG. 9A is an exploded perspective view illustrating the construction of the mounting and its attachment to a junction box.
Figure 9B:
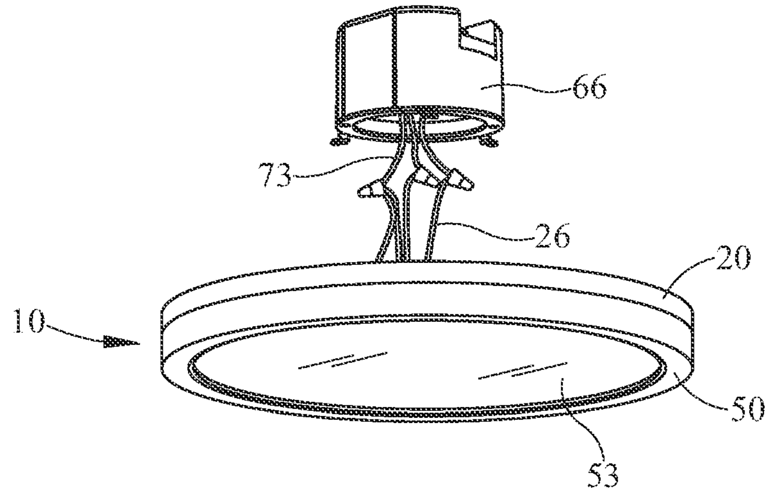
FIG. 9B is a side perspective view showing the voltage supply leads of the junction box connected to the input leads of the control circuit.
Figure 9C:
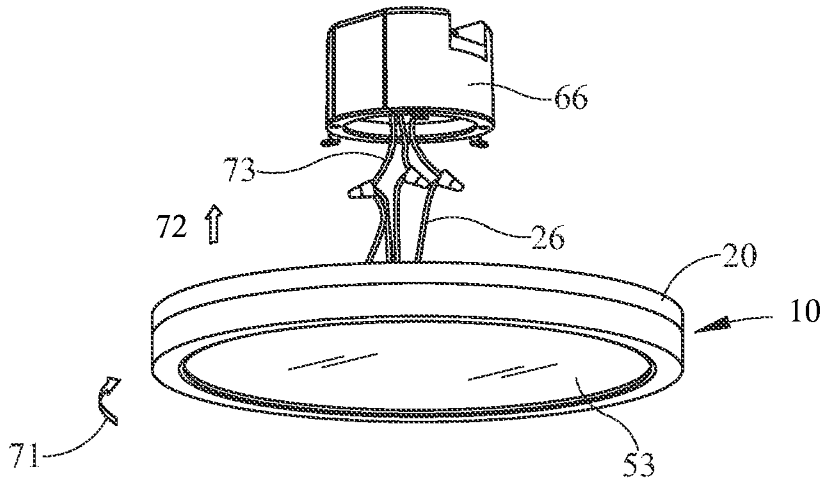
FIG. 9C is a further exploded perspective view illustrating how the dual LED light fixture is attached to the mounting plate.
Figure 9D:
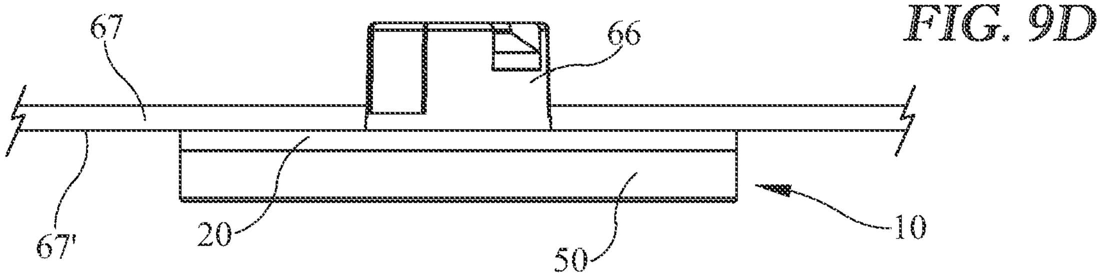
FIG. 9D is a side view showing the dual LED light fixture mounted against a ceiling sheet material with the junction box recessed.
Figure 10:
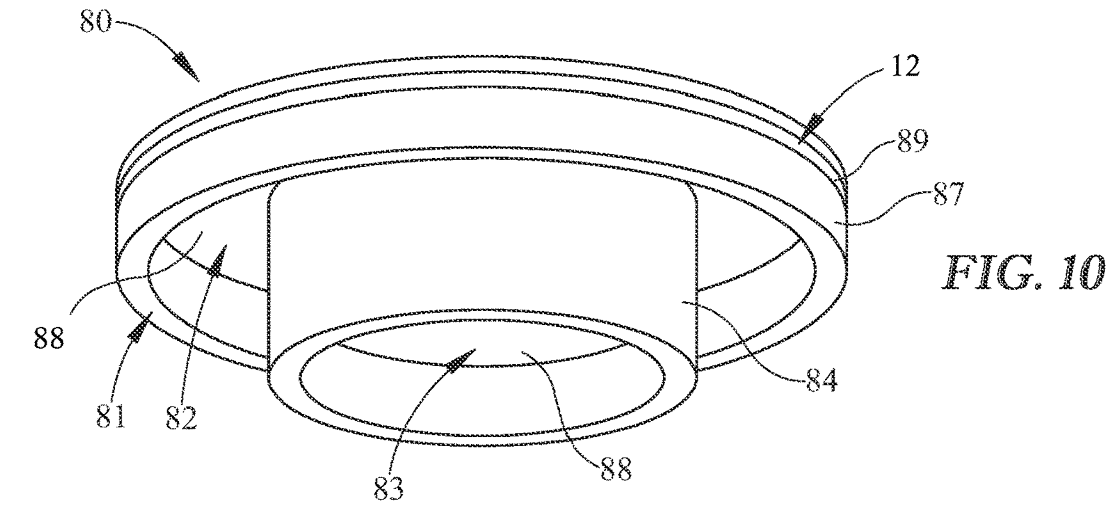
FIG. 10 is a perspective view, as seen from below, of a modified flush-mounted ceiling light fixture incorporating the dual LED light structure of the present invention and wherein the lower LED light source housing is comprised of an outer circumferential light housing section and an inner central housing section.
Figure 11:
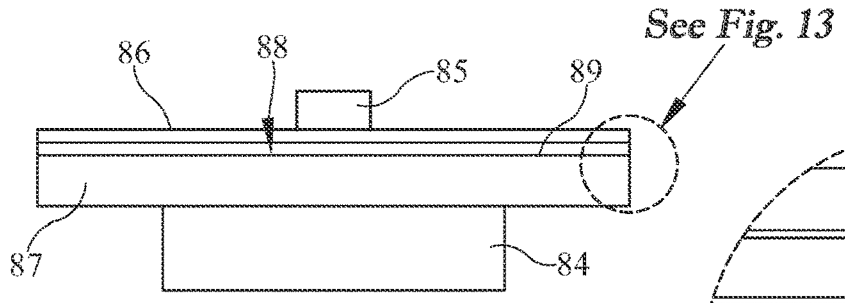
FIG. 11 is a side view of FIG. 10.
Figure 13:
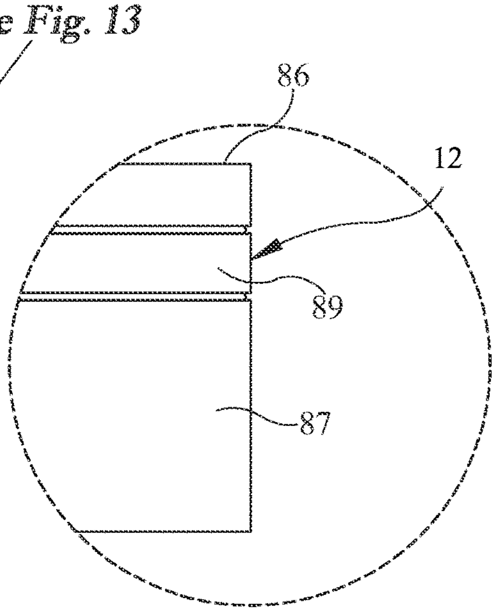
FIG. 13 is an enlarged fragmented side view oof the outer side wall of the light fixture showing the position of the circumferential lens section of the rear side light housing.
Figure 12:
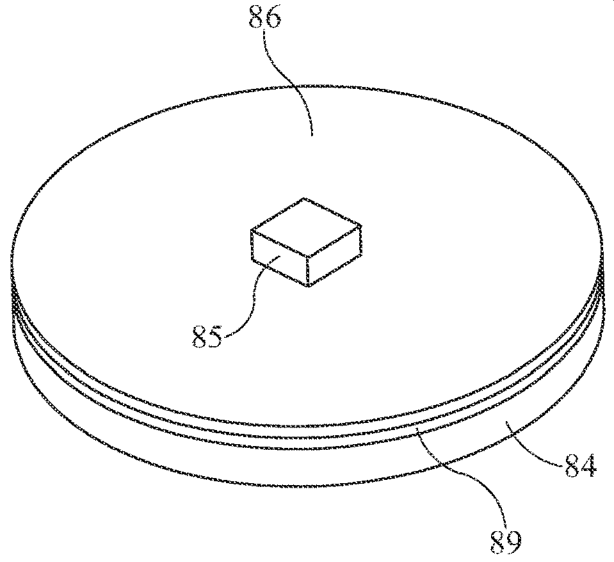
FIG. 12 is a top perspective view of FIG. 10.

Referring now to FIGS. 9A to 9D, there is described the installation of the dual LED light fixture 10 of the present invention. As herein shown a mounting plate 65 is provided and adapted for connection to a conventional recessed junction box 66 mounted behind a ceiling sheet material 67 as shown in FIG. 9D. The input leads 26 of the voltage converter and supply circuit 25 are herein shown connected to the junction box power leads 73 to provide power to the circuit for the operation of the LED's of the lower and upper housing of the light fixture 10. The mounting plate 65 has snap connectors 68 projecting downwardly and outwards therefrom and extend spaced from the outer surface 67' of the ceiling sheet material 67 when connected by screws 69 to the threaded hole provided in the junction box connecting flanges, as is well known in the art. Snap connector retention flange formations 70, as shown in FIG. 5, are secured to a top wall outer surface 24 of an upper projecting hub region 17 on which the LED light power supply and control circuit is mounted. The retention flange formations 70 are frictionally engaged and retained by the snap connectors 68 by moving the dual LED light fixture 10 upwards and against the outer surface 67' of the ceiling sheet material 67, as shown by arrow 72, with the retention flanges in off-set alignment with respective snap connectors and rotating the dual LED light fixture in a counter-clockwise direction, as shown by arrow 71, to cause rigid frictional engagement of the retention flanges 70 with the snap connectors 68.

Having described herein above the concept of the dual LED light fixture of the present invention, incorporated in a flush-mounted ceiling LED light fixture, further embodiments of different types of LED light fixtures are now described below. The power supply and dimmer circuit, as well as the control circuit utilized to control the LED light sources, of the further embodiments is substantially the same as with the first embodiment described in detail above, and illustrated in FIGS. 8A and 8B, and will not be repeated for the reason of its obvious adaption into the structure of the further embodiments described below.

As shown in FIGS. 10 to 13, there is illustrated a second embodiment of the LED light fixture constructed in accordance with the present invention, and herein in the form of another flush mounted ceiling LED light fixture 80, adapted to be secured to a junction box, not shown and which is secured to supports inside a ceiling, structure. With this embodiment, the lower LED light source housing is a twin light source housing 81 comprised of an outer circumferential light housing section 82 and an inner central housing section 83. A circumferential depending division side wall 84 isolates the inner central housing section 83 from the outer circumferential housing section 81.

Although not shown, each of the lower LED light source housing sections 82 and 83 are provided with individual sets of LED light sources and driver circuits which are independently controlled by the control circuit, in a similar fashion as described with the embodiment of FIGS. 1 to 9. The power supply dimming circuit and the control circuit including the two driver circuits of the LED light sources are housed in a small housing 85 centrally located on the top wall 86 of the light fixture and adapted to be received in a ceiling recessed junction box. The outer light housing section 82 is fitted with a light transmitting lens 88 recessed between a circumferential outer side wall 87 of the twin light housing and the depending circumferential division side wall 84 and through which light from its set of LED's project. Similarly, the central housing section 83 is also fitted with a light transmitting lens 88 through which its light emits. The lower drive current supply circuit is comprised of a first driver current circuit section and a second driver current section which are operative to provide driver current to the LED light sources in the outer circumferential light housing section 82 and the inner central housing section 83 independently or jointly. The dimming circuit is operative to independently control the light intensity generated by the LED light sources in the outer circumferential light housing section and the inner central housing section. The upper light source housing 88 is constructed in a like manner as above described with reference to the first embodiment and light therefrom emits through a circumferential lens 89 thereabout. Although not shown, but described with respect to the first embodiment, a division wall or an assembly of components of the structure isolates the twin LED light source housing 81 from the upper LED light source housing.

Figure 14:
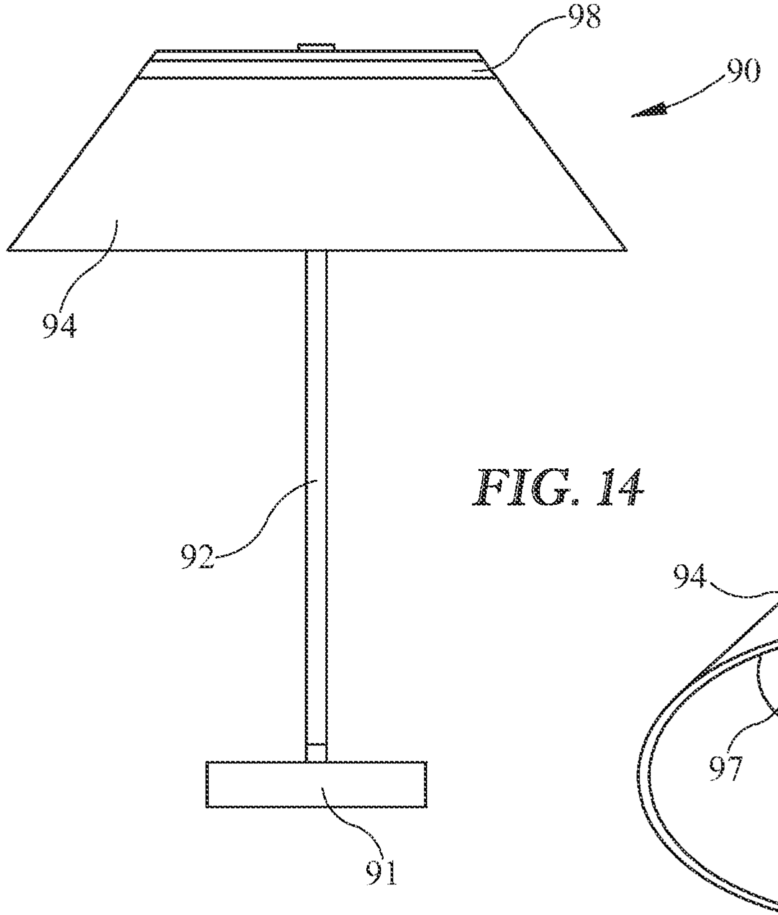
FIG. 14 is a side view of a table lamp incorporating the dual LED light structure of the present invention which is incorporated in a lamp shade design of the light fixture.
Figure 15:
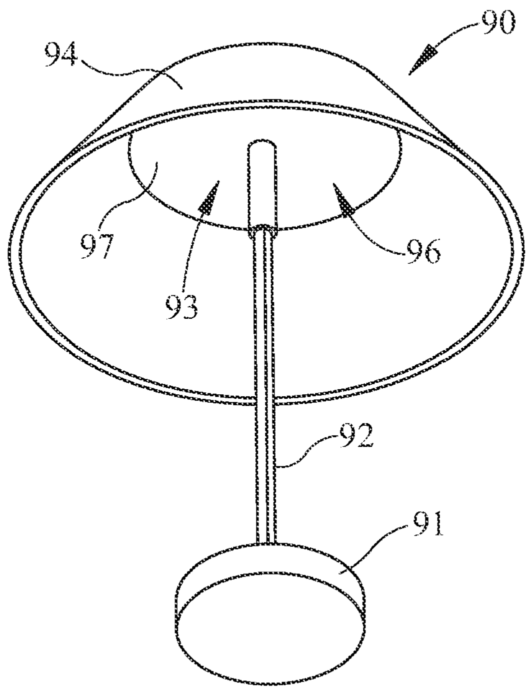
FIG. 15 is a bottom perspective view of the table lamp of FIG. 14.
Figure 16:
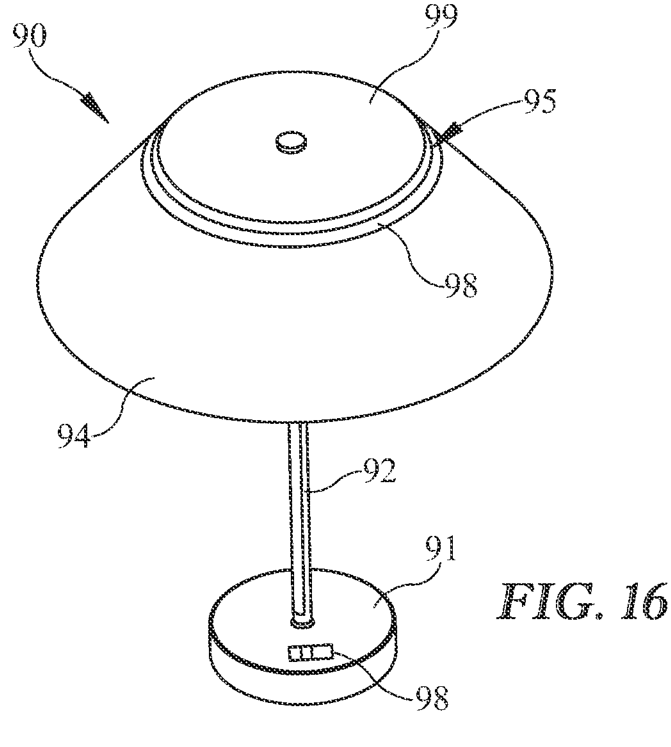
FIG. 16 is a top perspective view of the table lamp of FIG. 14.

A third embodiment is now described with reference to FIGS. 14 to 16, wherein the dual LED light fixture is a table lamp fixture 90. The table lamp 90 is comprised of a support base 91 with an elongated support post 92 extending vertically there above and at the top of which is supported the dual LED light fixture 93. A shade 94 isolates the rear LED light housing 95 from the forward LED light source housing 96. The downward LED light source housing 96 directs light emitted from its LED light source in a downward direction through its light transmitting lens 97. The rear LED light source housing 95 directs its light in a rear sideward direction.

The LED power supply dimming circuit and light control circuit, as described with the first embodiment, is located inside the support base 91 and wiring extends inside the support post 92. As herein illustrated a manual control 98 can be provided on the support base 91 for selective operation of the forward LED light source and the rear LED light source to generate light separately or together. A dimmer switch 98 is also provided for adjusting the light intensity of both the forward and rear LED light sources in their housings 96 and 95.

Alternatively, the dimming circuit and forward and rear LED light sources driver current circuits, as well as the switch, as described in the first embodiment, may be operable by a remote wireless communication device to provide remote selective operation of the LED light sources in the forward and rear LED light source housings 96 and 95. As illustrated, the shade 94 is an integrated part of the light fixture 90 formed with an upper light diffusing lens 108, in the shape of a circumferential ring disposed in alignment with the outer circumferential light transmitting outer side area of the rear LED light source housing 95, in a like manner as with the first embodiment structure. A rigid top wall 99 is secured to a top end of the support post 92. Wires from the control circuit mounted in the base and connected to the upper light source housing 95 and 96 are concealed in the support post 92. It is pointed out that the support post 92 may have other forms and is not limited to the tubular design as herein illustrated. Similarly, the shade may have other shapes.

Figure 17:
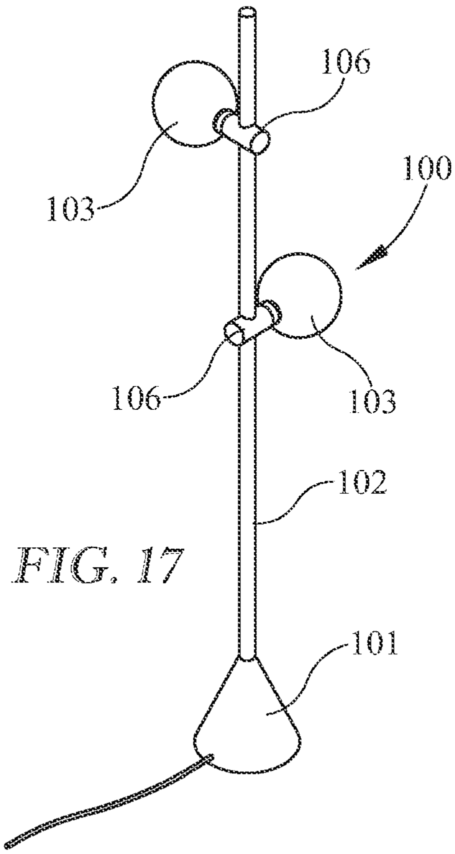
FIG. 17 is a perspective view of a floor lamp incorporating the dual LED light structure of the present invention and wherein the forward light source housing has a light transmitting globe secured thereto and the rear LED light source housing is of cylindrical shape and secured spaced from the rear of the forward light source housing with the dual LED light fixture supported elevated on a support post of the floor lamp.
Figure 18:
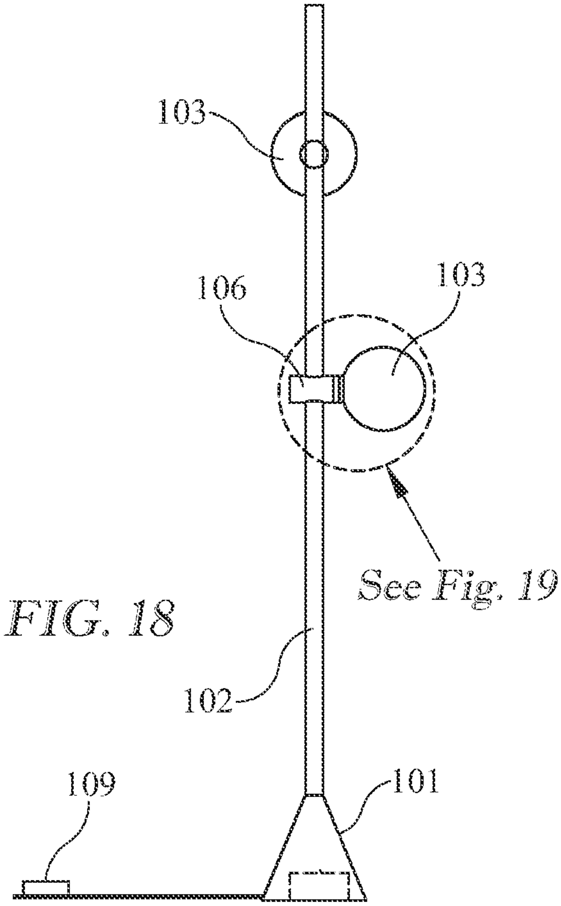
FIG. 18 is a side view of the floor lamp of FIG. 17.
Figure 19:
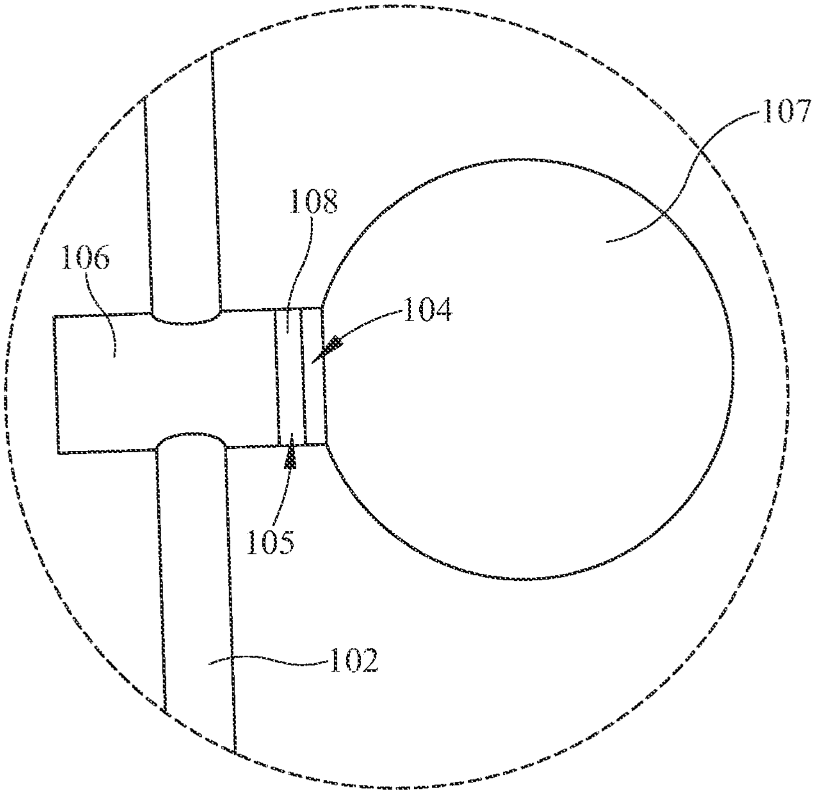
FIG. 19 is an enlarged view showing in clearer detail the position of the LED light fixture housing.

Referring now to FIGS. 17 to 19, there is described a fourth embodiment of the dual LED light fixture, herein in the form of a floor lamp fixture 100. The floor lamp fixture 100 is comprised of a support base 101 to which is secured a support post 102 extending vertically therefrom. One or more dual LED light fixtures, herein two dual LED light fixtures 103 being illustrated, are secured to the support post 102 at different elevated positions from the support base 101. As shown more clearly in FIG. 19, the forward LED light source housing 104 is formed in a forward part of a cylindrical support 106 secured transversely to the support post 102. The rear LED light source housing 105 is also secured to the cylindrical support 106 behind the forward LED light source housing 104. With this embodiment, a miniature design of the dual LED light fixture is incorporated in a small cylindrical housing horizontally mounted with the rear LED light source housing generating light in a circumferential direction about the cylindrical support 106 in a direction transverse to the forward LED light source housing 104.

The forward LED light source housing 104 is fitted with a light transmitting globe 107, instead of a lens as previously described with the other embodiments. The globe 107 is secured about an outer open end of the forward LED light source housing 104, in a manner well known in the art, and configured to direct light in a multi-forward direction including the downward direction. A circumferential light diffusing lens 108 is secured about the rear LED light source housing 105.

Like the third embodiment described above, the LED light control circuit shown in phantom lines, is mounted in the support base 101 of said floor lamp 100. A foot control switch 109 may be provided to switch the light fixture 100 "on" and "off" and to control the light intensity. A further switch may be provided to select individual ones of the light sources and to operate them individual. However, with this embodiment of the dual LED light fixture 100 it is preferable to operate the fixture by remote wireless communication device to selectively adjust the intensity and CCT of the forward and rear LED light sources independently or jointly.

Many modifications and other embodiments of the present invention as described above will come to mind to a person skilled in the art to which the invention pertains having the benefit of the teachings described herein above and the drawings. Hence, it is to be understood that the embodiments of the present invention are not to be limited to the specific examples thereof as described herein and other embodiments are intended to be included within the scope of the present invention and the appended claims. Although the foregoing descriptions and associated drawings describe example embodiments in the context of certain examples of the elements and members and/or functions, it should be understood that different combinations of elements or substitutes and/or functions may be provided by different embodiments without departing from the scope of the present invention as defined by the appended claims. Furthermore, although specific terms are employed herein, they are used in a generic and descriptive sense only and other equivalent terms are contemplated herein with respect to the items that they relate to. It is therefore within the ambit of the resent invention to encompass all obvious modifications of the examples of the preferred embodiment described herein provide such modifications fall within the scope of the appended claims.

The invention claimed is:

1. A dual LED light circuitry comprising:

a power control circuit;

a lower driver current supply circuit and an upper driver current supply circuit, the lower driver current supply circuit supplying a first set of LEDs connected in parallel, the upper driver current supply circuit supplying a second set of LEDs connected in parallel; and a remotely operable switch, wherein the lower driver current supply circuit and the upper driver current supply circuit are connected when the remotely operable switch is in a first state, the lower driver current supply circuit and the upper driver current supply circuit are disconnected when the remotely operable switch is in a second state, and wherein correlated color temperatures of the first set of LEDs and second set of LEDs are controlled by the remotely operable switch.

2. The dual LED light circuitry of claim 1, wherein the first set of LEDs comprise a first subset of white LEDs and a first subset of color LEDs, and wherein the second set of LEDs comprise a second subset of white LEDs and a second subset of color LEDs.

3. The dual LED light circuitry of claim 1, wherein the remotely operable switch controls dimming of the first set of LEDs and the second set of LEDs.

4. The dual LED light circuitry of claim 1, wherein the remotely operable switch is controlled by a wireless device.

5. The dual LED light circuitry of claim 4, wherein the wireless device controls the remotely operable switch using an application downloaded on the wireless device.

6. The dual LED light circuitry of claim 5, wherein the application provides one or more timers controlling output of the first set of LEDs and the second set of LEDs.

7. The dual LED light circuitry of claim 4, wherein the application provides one or more preset functions controlling dimming and correlated color temperature combinations of the first set of LEDs and the second set of LEDs.

8. The dual LED light circuitry of claim 7, wherein the preset functions controlling dimming and correlated color temperature combinations of the first set of LEDs and the second set of LEDs include a first preset function to operate the first set of LEDs and the second set of LEDs at a 3000 k correlated color temperature and a second preset function to operate the first set of LEDs and the second set of LEDs at a 6500 k correlated color temperature.

9. The dual LED light circuitry of claim 4, wherein the wireless device is a phone.

10. The dual LED light circuitry of claim 4, wherein biometric data is processed by the wireless device to determine whether a user associated with the biometric data is registered to control the remotely operable switch.

11. The dual LED light circuitry of claim 4, wherein the wireless device communicates with, and controls, the remotely operable switch through internet communication.

12. The dual LED light circuitry of claim 1, wherein the correlated color temperatures of the first set of LEDs and the second set of LEDs are controlled jointly by the remotely operable switch.

13. The dual LED light circuitry of claim 1, wherein the correlated color temperatures of the first set of LEDs and the second set of LEDs are controlled independently by the remotely operable switch.

14. The dual LED light circuitry of claim 1, wherein the remotely operable switch is a MOSFET transistor.

15. The dual LED light circuitry of claim 1, wherein the power control circuit controls current provided to the upper current driver supply circuit and the lower current driver supply circuit.

16. The dual LED light circuitry of claim 1, wherein the correlated color temperature of the first set of LEDs and the second set of LEDs is controlled to generate at least one or more light tones, one or more light colors, and/or one or more light intensities.

17. A dual LED light fixture comprising:

a lower LED light source housing including an outer circumferential LED light housing section having a first lower LED light source, and an inner central LED light housing section having a second lower LED light source, wherein an inner wall at least partially separates the inner central LED light housing section from the outer circumferential LED light housing section;

an upper LED light source housing being located on an outer circumferential light transmitting outer side area adjacent to the lower LED light source housing, the upper LED light source housing including an upper LED light source; and an LED control circuit comprising a lower driver current supply circuit controlling the first lower LED light source and the second lower LED light source, an upper driver current supply circuit controlling the upper LED light source, and a remotely operable switch controlling output of the first lower LED light source, output of the second lower LED light source, and output of the upper LED light source.

18. A dual LED light circuitry comprising:

a power control circuit;

a lower driver current supply circuit controlling a first lower LED light source and a second lower LED light source, an upper driver current supply circuit controlling an upper LED light source, and a remotely operable switch controlling output of the first lower LED light source, output of the second lower LED light source, and output of the upper LED light source, wherein the lower driver current supply circuit and the upper current supply circuit are connected when the remotely operable switch is in a first state, and the lower driver current supply circuit and the upper current supply circuit are disconnected when the remotely operable switch is in a second state, and wherein correlated color temperatures of at least the first lower LED light source, the second lower LED light source, and the upper LED light source are controlled by the remotely operable switch.

19. The dual LED light circuitry of claim 18, wherein the remotely operable switch is controlled by a wireless device using an application downloaded on the wireless device.

20. The dual LED light circuitry of claim 18, wherein the output of the first lower LED light source, the output of the second lower LED light source, and the output of the upper LED light source are controlled jointly.

21. The dual LED light circuitry of claim 18, wherein the output of the first lower LED light source, the output of the second lower LED light source, and the output of the upper LED light source are controlled independently.

* * * * *